(12) United States Patent
Stephens, Jr.

(10) Patent No.: US 11,136,003 B2
(45) Date of Patent: Oct. 5, 2021

(54) DRYING APPARATUS, SYSTEM AND METHOD FOR USE IN AN AUTOMATED VEHICLE CLEANING SYSTEM

(71) Applicant: International Drying Corporation, Praire Grove, IL (US)

(72) Inventor: Arthur D. Stephens, Jr., Praire Grove, IL (US)

(73) Assignee: International Drying Corporation, Praire Grove, IL (US)

( * ) Notice: Subject to any disclaimer, the term of this patent is extended or adjusted under 35 U.S.C. 154(b) by 164 days.

(21) Appl. No.: 16/565,761

(22) Filed: Sep. 10, 2019

(65) Prior Publication Data

US 2020/0079328 A1    Mar. 12, 2020

Related U.S. Application Data

(60) Provisional application No. 62/729,647, filed on Sep. 11, 2018.

(51) Int. Cl.
| | |
|---|---|
| *B60S 3/00* | (2006.01) |
| *B60S 3/04* | (2006.01) |
| *F26B 21/00* | (2006.01) |
| *G10K 11/16* | (2006.01) |
| *G10K 11/162* | (2006.01) |
| *F26B 3/04* | (2006.01) |

(52) U.S. Cl.
CPC ............... *B60S 3/002* (2013.01); *B60S 3/04* (2013.01); *F26B 3/04* (2013.01); *F26B 21/004* (2013.01); *G10K 11/161* (2013.01); *G10K 11/162* (2013.01); *F26B 2210/12* (2013.01)

(58) Field of Classification Search
CPC .... B60S 3/002; B60S 3/04; F26B 3/04; F26B 21/004; F26B 21/221012; F26B 2210/12; G10K 11/161; G10K 11/162
USPC .......................................................... 34/666
See application file for complete search history.

(56) References Cited

U.S. PATENT DOCUMENTS

| | | | | |
|---|---|---|---|---|
| 3,918,171 A | * | 11/1975 | Hull ........................ | B60S 3/002 34/666 |
| 4,683,668 A | * | 8/1987 | Hondzinski ............. | B60S 3/002 239/446 |
| 4,979,316 A | * | 12/1990 | Belanger ................. | B60S 3/002 15/316.1 |

(Continued)

FOREIGN PATENT DOCUMENTS

| | | | | |
|---|---|---|---|---|
| BR | PI0713776 A2 | * | 10/2012 | ............... F26B 15/14 |
| CA | 2655813 C | * | 5/2013 | ............. F26B 25/066 |

(Continued)

*Primary Examiner* — Stephen M Gravini
(74) *Attorney, Agent, or Firm* — Stephen T. Scherrer; Monique A. Morneault; Scherrer Patent & Trademark Law, P.C.

(57) ABSTRACT

The present disclosure relates to an improved drying apparatus, system and method for use in an automated vehicle cleaning system. Specifically, an improved drying apparatus, system and method is provided, which includes a series of components resulting in combined sound reducing features and incorporating sound absorbing acoustic materials creating a quiet technology system. The present disclosure provides a drying apparatus with an overall lower decibel level, without sacrificing air flow and efficiency in the drying of a vehicle.

18 Claims, 7 Drawing Sheets

(56) References Cited

U.S. PATENT DOCUMENTS

| | | | | |
|---|---|---|---|---|
| 5,596,818 | A * | 1/1997 | Jones | B60S 3/002 134/57 R |
| 5,749,161 | A * | 5/1998 | Jones | B60S 3/002 134/57 R |
| 6,176,024 | B1 * | 1/2001 | McElroy | B60S 3/002 15/316.1 |
| 6,530,115 | B2 * | 3/2003 | MacNeil | B60S 3/002 15/316.1 |
| 6,735,884 | B2 * | 5/2004 | Fratello | B60S 3/002 239/751 |
| 7,150,112 | B2 * | 12/2006 | Faytlin | B60S 3/002 34/666 |
| 8,528,232 | B1 * | 9/2013 | Ennis | B60S 3/002 34/666 |
| 2009/0172966 | A1 * | 7/2009 | Napfel | F26B 15/14 34/216 |
| 2020/0079328 | A1 * | 3/2020 | Stephens, Jr. | G10K 11/168 |
| 2021/0041110 | A1 * | 2/2021 | Pi | F24C 15/322 |

FOREIGN PATENT DOCUMENTS

| | | | | |
|---|---|---|---|---|
| EP | 2035765 | B1 * | 5/2014 | F26B 15/14 |
| JP | 2004183964 | A * | 7/2004 | B08B 5/02 |
| JP | 3971991 | B2 * | 9/2007 | F24F 9/00 |
| JP | 5038409 | B2 * | 10/2012 | F26B 25/066 |
| KR | 101379790 | B1 * | 4/2014 | F26B 25/066 |

* cited by examiner

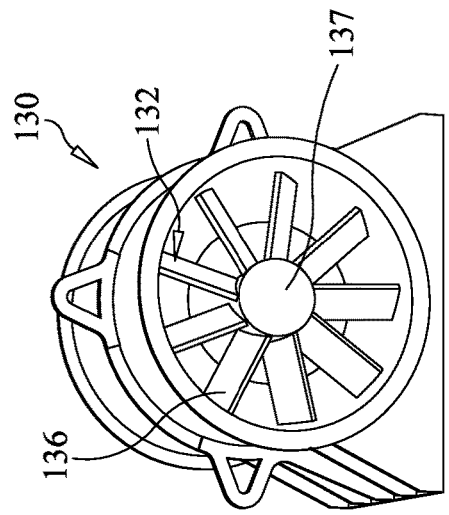
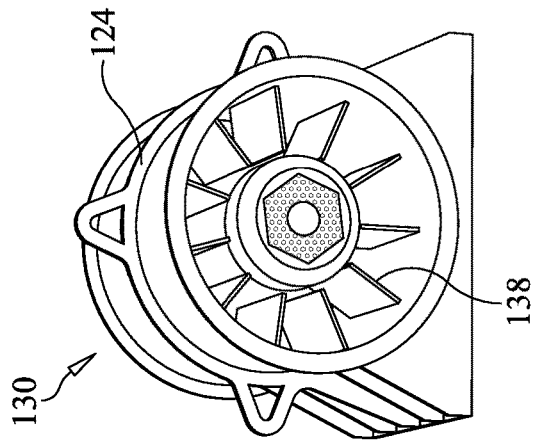
FIG. 7
FIG. 8
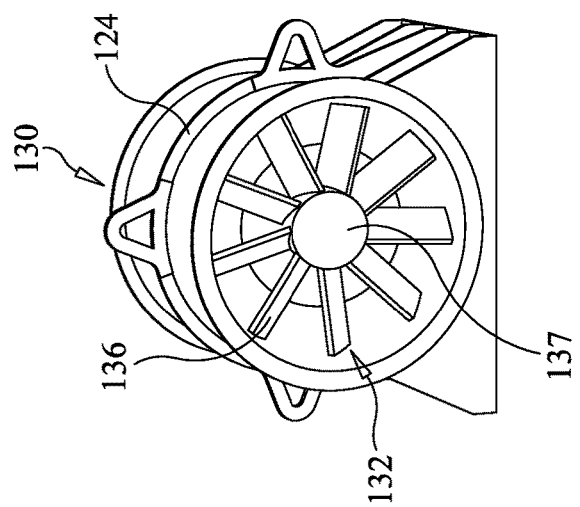
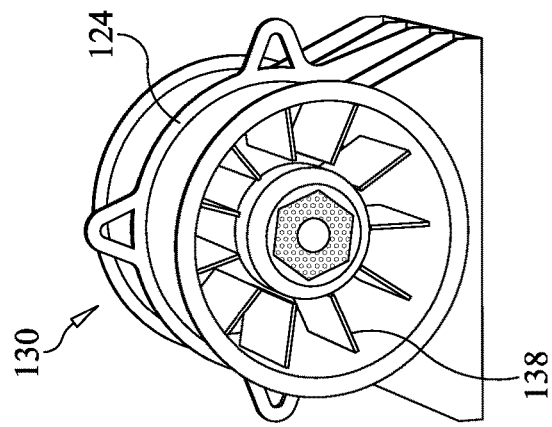

DRYING APPARATUS, SYSTEM AND METHOD FOR USE IN AN AUTOMATED VEHICLE CLEANING SYSTEM

TECHNICAL FIELD

The present disclosure relates to an apparatus, system and method for use in the automated vehicle cleaning system. More specifically, the present disclosure relates to a drying apparatus and system, wherein the apparatus and system provide a combination of increased airflow and improved sound reduction particularly in connection with the drying apparatus used in the automated vehicle cleaning system. The combination of sound reducing features and components of the present apparatus results in a drying apparatus having a "quiet technology" system.

BACKGROUND

Automated washing systems for the exterior of vehicles are a popular convenience. Automated washing systems can include those where the driver leaves the vehicle, and goes to a waiting area while an attendant takes care of driving the vehicle through the tunnel-like wash system. Other popular systems include where the driver remains in the vehicle, while the vehicle enters a wash chamber or tunnel and is pushed or pulled along a conveyor by wheels or rollers while the vehicle is in neutral. Regardless of the style of washing system, it is important that the vehicle is clean and as dry as possible when it exits the system.

While in the automated wash chamber, the vehicle encounters various stages of washing and rinsing apparatus along the way. In some instances, sprayers, soft cloths or rollers and brushes contact the body of the vehicle during the wash/rinse cycle. Additional features, such as protectant or wax sprays, or tire shine can be applied to the vehicle during the wash/rinse cycle. Alternatively, only soap and water spray contacts the vehicle in a "touchless" manner, where the vehicle either moves through the chamber, or the equipment moves around the vehicle, as a gantry-type system. In a gantry system, the vehicle remains stationary and the wash/rinse apparatus, which is suspended above and around the vehicle, reciprocates back and forth and around the vehicle providing the different washing, rinsing and drying cycles of the system.

Regardless of the washing/rinsing method used, a drying system is typically provided at the end of the washing and rinsing cycle in an automated vehicle washing system, to minimize or eliminate the need for manual drying of the vehicle. A variety of different types of drying stations have been employed to remove water from the exterior of the vehicle. One such drying station employs one or more individually placed blow dryers along the walls and/or ceiling of the chamber. Each dryer typically incorporates a fan for generating air and directing the air in the direction of the vehicle. Another optional dryer configuration includes a cylinder having one or more nozzles aligned along the body of cylinder for directing the air flow to the passing vehicle. In these drying stations, the vehicle passes by the dryers, which emit high velocity air onto the vehicle, to blow water off the vehicle exterior. The dryers can be arranged in various different configurations, such as above and along the side where the vehicle will pass, placed in different locations within the wash system, and be oriented in a variety of different ways, all with a goal to more effectively blow water off the vehicle exterior. Additionally, the dryers can be either stationary or oscillating. In many cases, heaters are added along with the blow dryers to enhance the drying of the vehicle.

Drying systems, particularly where there are multiple blow dryers in the system, can be quite loud for both the customers in the vehicles, and those employees working around the automated washing system, because of the air being forced through the system at high rates. Placement of multiple drying units within the cleaning chamber can magnify the sound of the dryer units within the chamber. Additionally, and depending on the direction and force of air flow, drying systems may not be efficient at removing all or virtually all of the water from the vehicle, thereby requiring the vehicle owner or employee of the washing facility to finish wiping the water residue from the vehicle after exiting the drying station.

A need, therefore, exists for an improved drying apparatus, system and method for use in an automated vehicle cleaning system. Specifically, a need exists for an improved drying apparatus, system and method that utilizes a combination of features and components resulting in "quiet technology" system, such that the drying apparatus operates with an increased air flow for efficient drying at a reduced sound level.

Moreover, a need exists for an improved drying apparatus comprising a variety of sound reducing components which contribute to lowering the decibel level of the drying apparatus used in the automated washing system.

A need further exists for an improved drying apparatus, system and method for use in an automated vehicle cleaning system that permits a variety of dryer unit configurations for more effective drying results.

Moreover, a need exists for an improved drying apparatus, system and method that provide a quieter surrounding even when multiple drying units are used for more efficient vehicle drying.

SUMMARY

The present disclosure relates to an improved drying apparatus, system and method for use in an automated vehicle cleaning system. Specifically, a need exists for an improved drying apparatus, system and method that utilizes a combination of components resulting in "quiet technology" so that the overall system operates at a lower decibel level, while providing improved air flow and more efficient drying of the vehicle. Quiet technology includes incorporating a variety of features into the present drying apparatus and system, including: lining interior surfaces of key components of the drying apparatus with sound-dampening materials, incorporation of a muffler onto the apparatus, and utilizing an axial fan with airfoil blades in conjunction with a plurality of static vanes to reduce air turbulence of the air flow through the system.

To this end, in an embodiment of the present disclosure, a drying apparatus for use in an automated vehicle washing system is provided. The drying apparatus comprises a support frame, at least one blower unit secured to the support frame, the blower unit having an inlet and an outlet, a fan and motor assembly positioned within the blower unit near the inlet, a plurality of static baffles positioned behind the fan and motor assembly, and an air producer at the outlet of the blower unit.

In an embodiment of the drying apparatus, the fan and motor assembly includes a fan having a plurality of airfoil blades disposed around a center rotor, wherein the plurality of airfoil blades and static baffles are configured for increasing an air flow while reducing a sound level of the apparatus.

In yet another embodiment, the drying apparatus includes sound-dampening or sound absorbing acoustic materials, applied in a plurality of layers lining an interior surface of the various components of the drying apparatus.

In another embodiment of the present disclosure, a system for automated drying of a vehicle in an automated washing system is provided. The system comprises a chamber for receiving a vehicle, a support frame positioned within the chamber and above a path for receiving the vehicle, a drying apparatus attached on the support frame and positioned near an exit of the chamber, the drying apparatus comprising at least one blower unit secured to the support frame, the blower unit having an inlet for receiving an air flow, a fan and motor assembly within the blower unit, wherein the fan includes a plurality of airfoil blades disposed around a rotor, an air producer at an outlet of the blower unit, an elbow connection between the fan and motor assembly and the air producer, wherein the elbow connection directs the air flow from the fan and motor assembly to the air producer and wherein the drying apparatus is configured to increase the air flow through the system while a reducing a sound level of the air flow.

In yet another embodiment, the drying system may further include multiple layers of sound absorbing acoustic materials lining components of the drying apparatus and system, including an interior surface of the connection elbow section and an interior surface of the air producer cylinder section.

In another embodiment of the present disclosure, a method of drying a vehicle within an automatic vehicle washing system, is provided. The method comprises the steps of: providing a chamber for receiving a vehicle, positioning a support frame within the chamber and above a path for receiving the vehicle, securing at least one drying apparatus on the support frame, the drying apparatus comprising a series of components configured for increasing air flow through the drying apparatus while reducing a sound level of the apparatus.

It is, therefore, an advantage and objective of the present disclosure to provide an improved drying apparatus and system for use in an automated vehicle cleaning system, wherein the drying apparatus provides improved air flow and reduced sound level.

It is yet another advantage and objective of the present disclosure to provide an improved drying apparatus and system including a series of components contributing to the drying apparatus having a "quiet technology," feature thereby reducing the overall noise level of the drying system.

It is further another advantage and objective of the present disclosure to provide an improved drying apparatus, system and method utilizing a series of components providing a "quiet technology," feature while providing improved air flow and efficient drying of the vehicle Yet another advantage and objective of the present disclosure is to provide an improved quiet technology blower unit having a housing enclosing a fan and motor assembly, the assembly comprising an axial fan having a plurality of airfoil blades around a center rotor, and a motor connected in line to the axial fan. The blower unit further includes a plurality of static baffles positioned behind the fan and within the interior of the fan and motor assembly section of the blower unit, the static baffles effectively reducing the turbulence of the airflow from the axial fan, thereby lowering the sound decibel levels through the blower housing.

A further advantage and objective of the present disclosure is to provide an improved blower unit further comprising a variety of insulation or sound absorbing acoustic materials layered within an interior surface of the series of components of the blower unit.

Additional features and advantages of the present disclosure are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 7 illustrates an embodiment of an axial fan in one end of a blower unit of the drying apparatus of the present disclosure;

FIG. 8 illustrates an embodiment of the motor and static baffles in an opposite end from the axial fan of the blower unit of the drying apparatus of the present disclosure; and, FIG. 9 illustrates a component of the drying apparatus of the present disclosure utilizing the quiet technology in the form of insulation or sound-dampening materials layered within an interior surface of the components of the drying apparatus; and,

DETAILED DESCRIPTION

The present disclosure relates to an improved drying apparatus, system and method for use in an automated exterior vehicle cleaning system. Specifically, an improved drying apparatus, system and method utilizing a combination of features and components resulting in "quiet technology," is provided. Quiet technology features and components results in the drying apparatus of the automated vehicle cleaning system operating at a lower decibel level and reduced noise, while providing improved airflow and efficient drying of the vehicle. "Quiet technology" further includes lining the interior surfaces of key components of the drying apparatus with sound-dampening materials, as well as, incorporating baffles and mufflers in the apparatus, as well as, fan blades with improved configurations and strategically arranged within the drying apparatus, to reduce air turbulence and noise levels. In this manner, the present disclosure provides a device and system offering more efficient drying with reduced noise levels for use in the automated vehicle cleaning industry.

Figure 1:
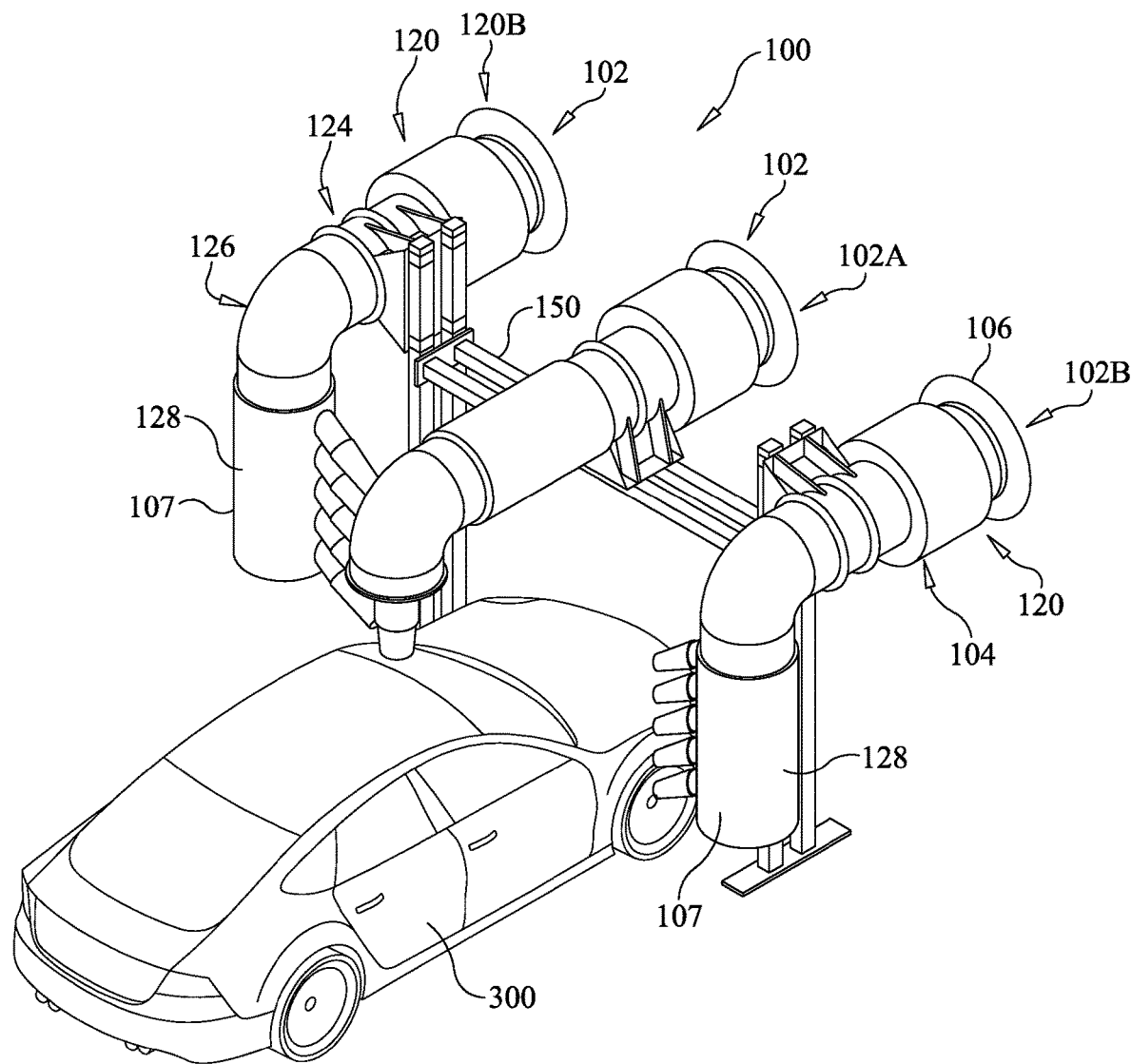
FIG. 1 illustrates an embodiment of a drying apparatus of the present disclosure in use in an automated vehicle cleaning system.
Figure 2:
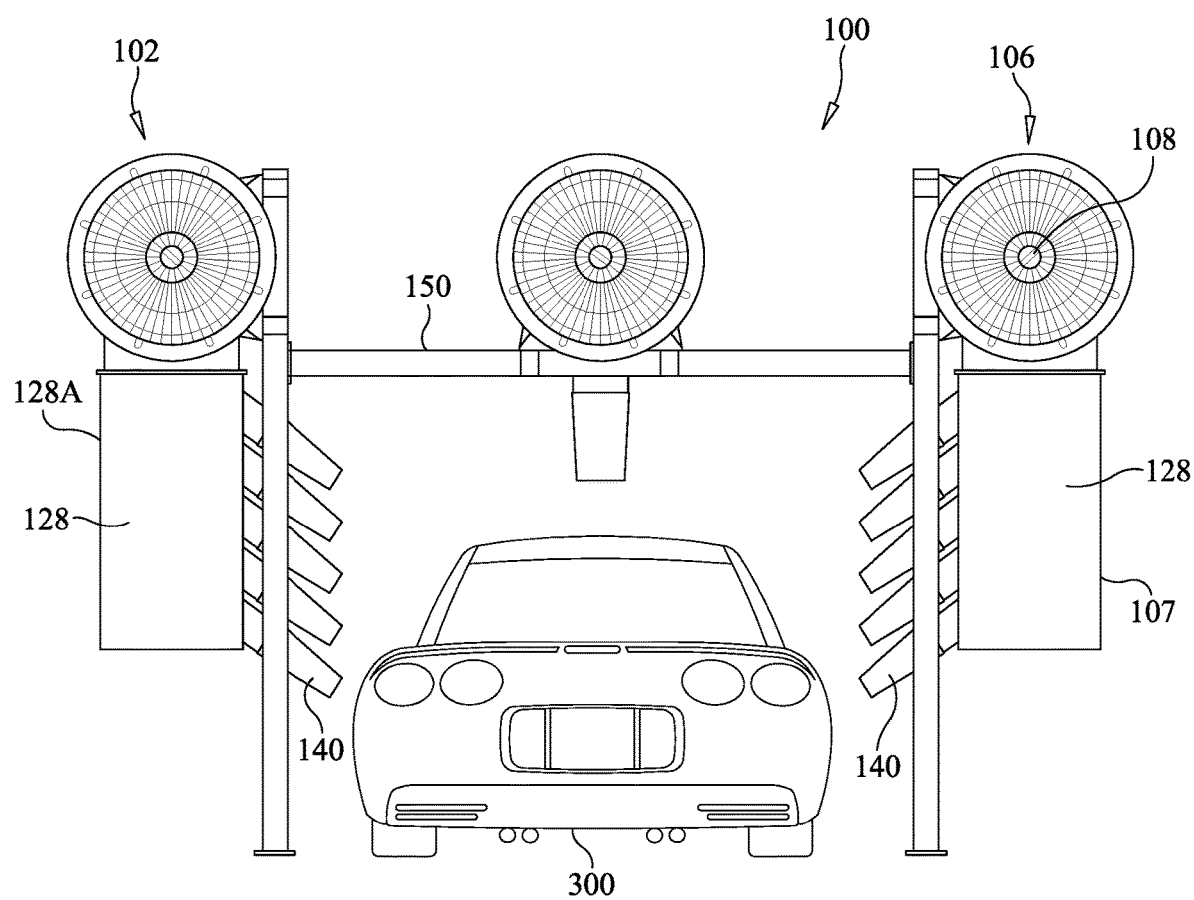
FIG. 2 illustrates a rear view of an embodiment of the drying apparatus of the present disclosure in use in an automated vehicle cleaning system.
Figure 3:
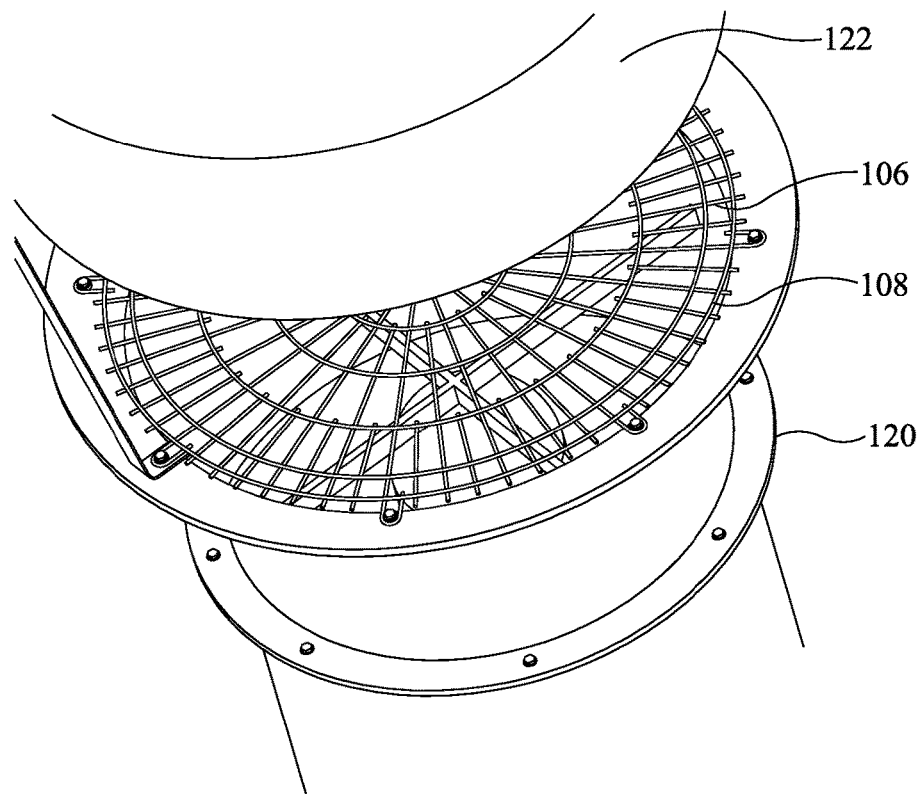
FIG. 3 illustrates an inlet and muffler portion of the drying apparatus of the present disclosure.
Figure 4:
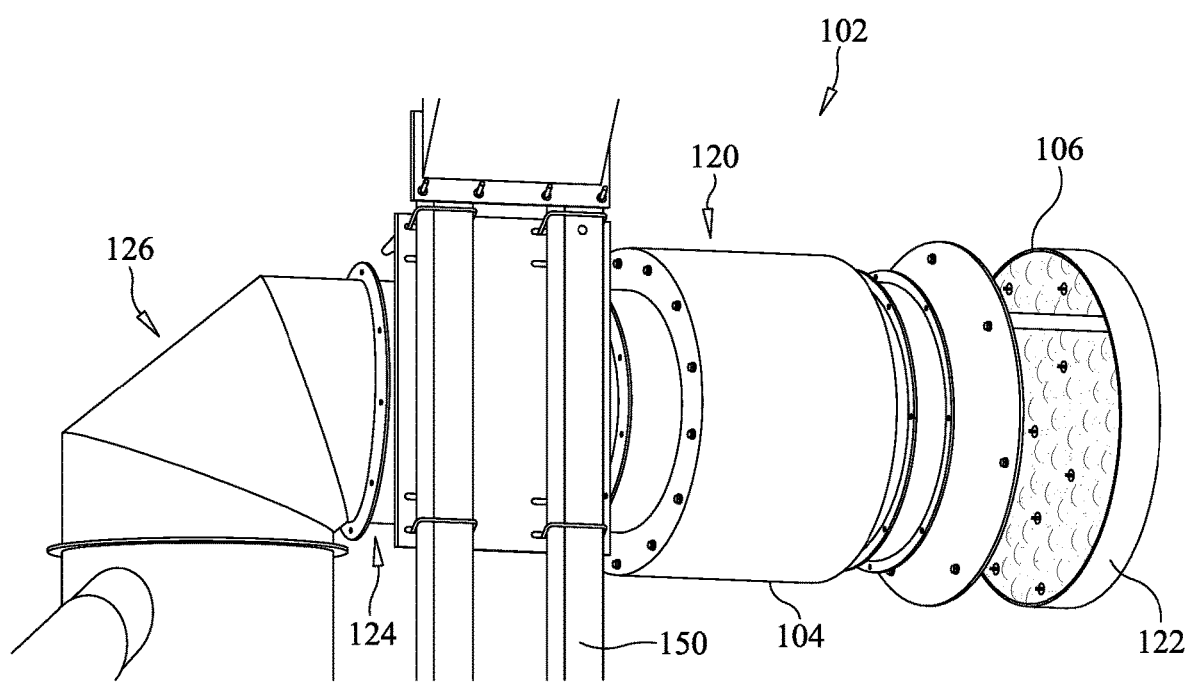
FIG. 4 illustrates a view of a portion of the drying apparatus of the present disclosure secured to the support frame arch.
Figure 5:
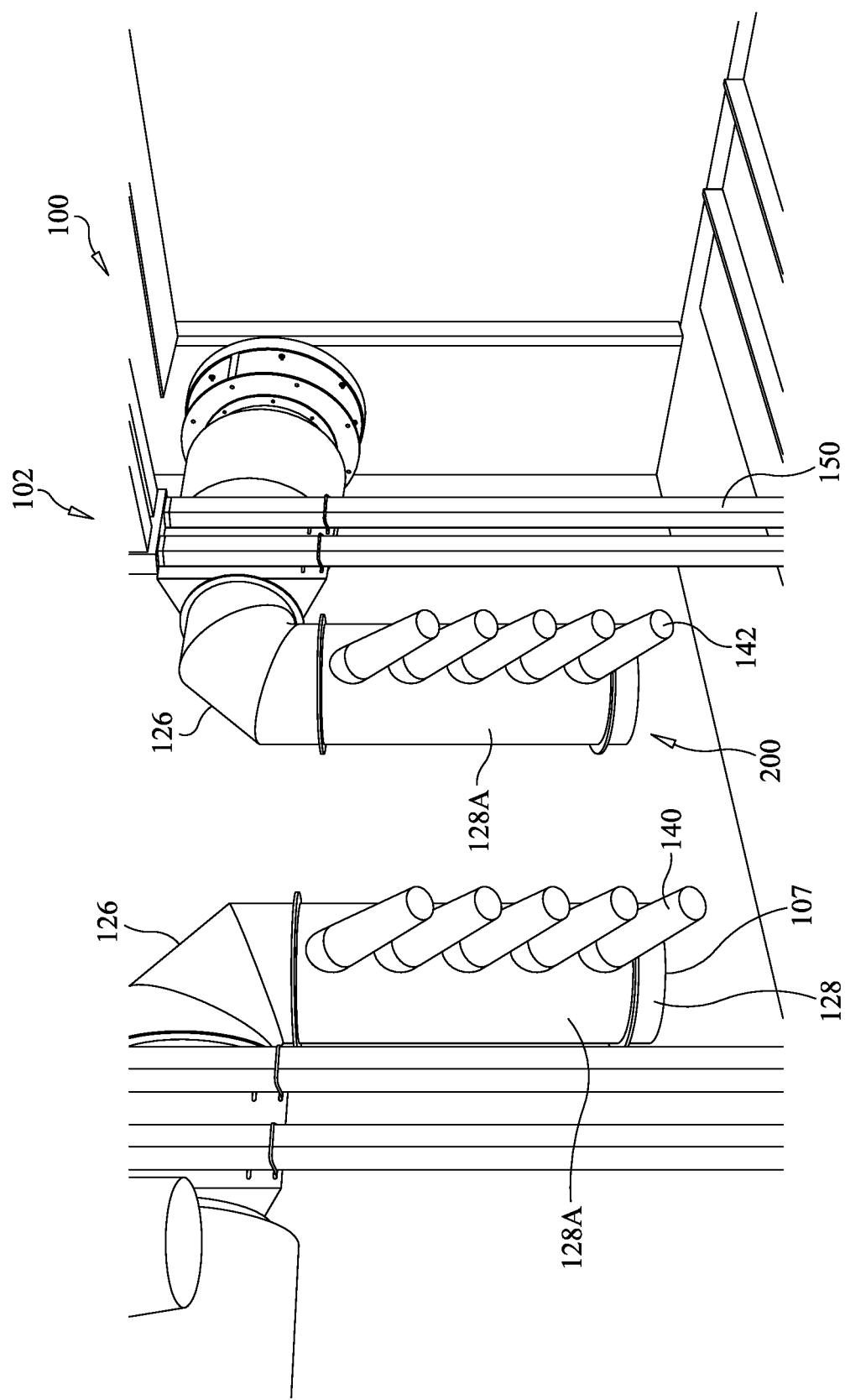
FIG. 5 shows a perspective view of the drying apparatus of the present disclosure, including the air nozzles.
Figure 6:
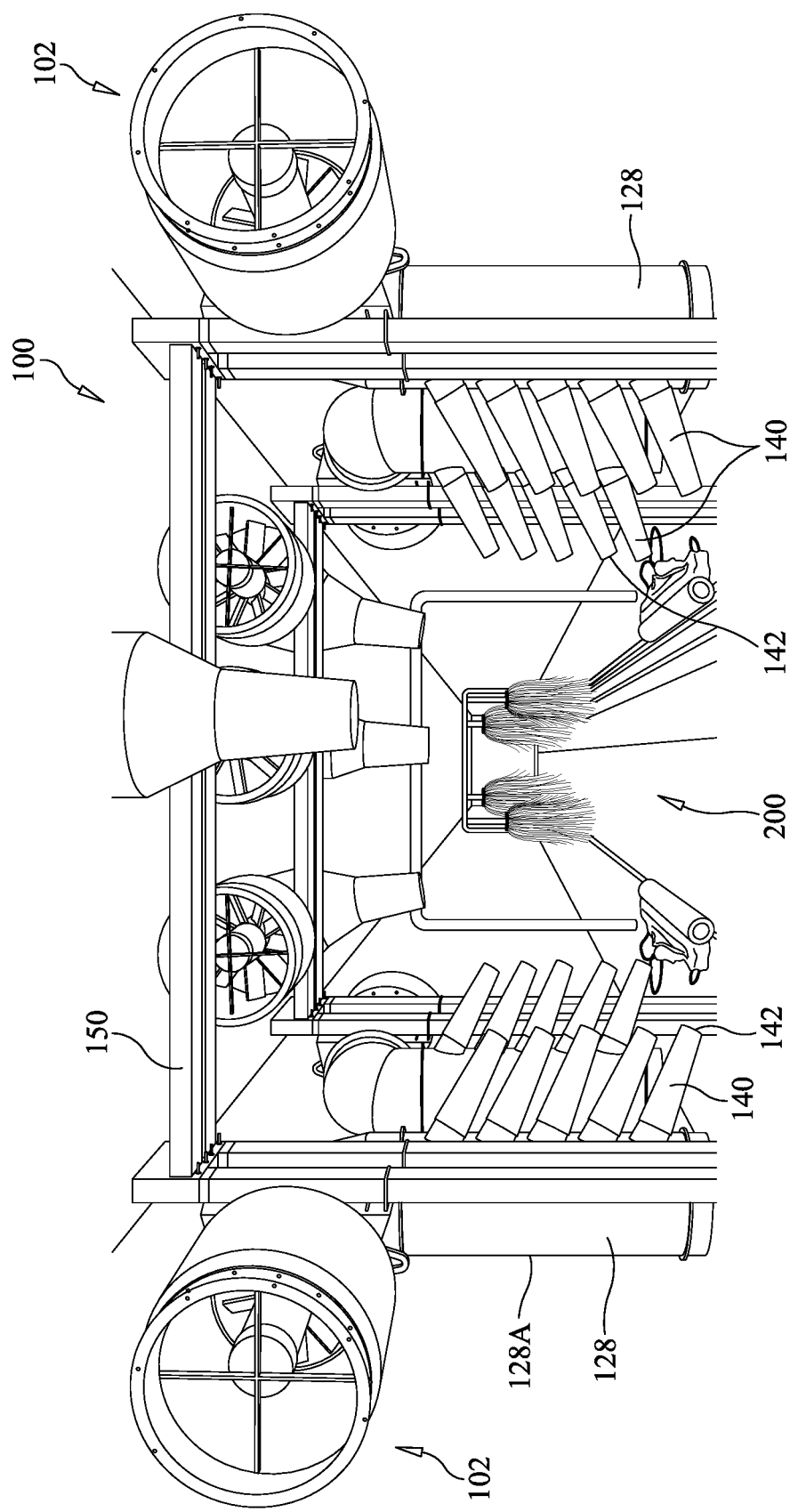
FIG. 6 illustrates another configuration of the drying apparatus of the present disclosure installed in an automated vehicle cleaning system chamber.
Figure 9:
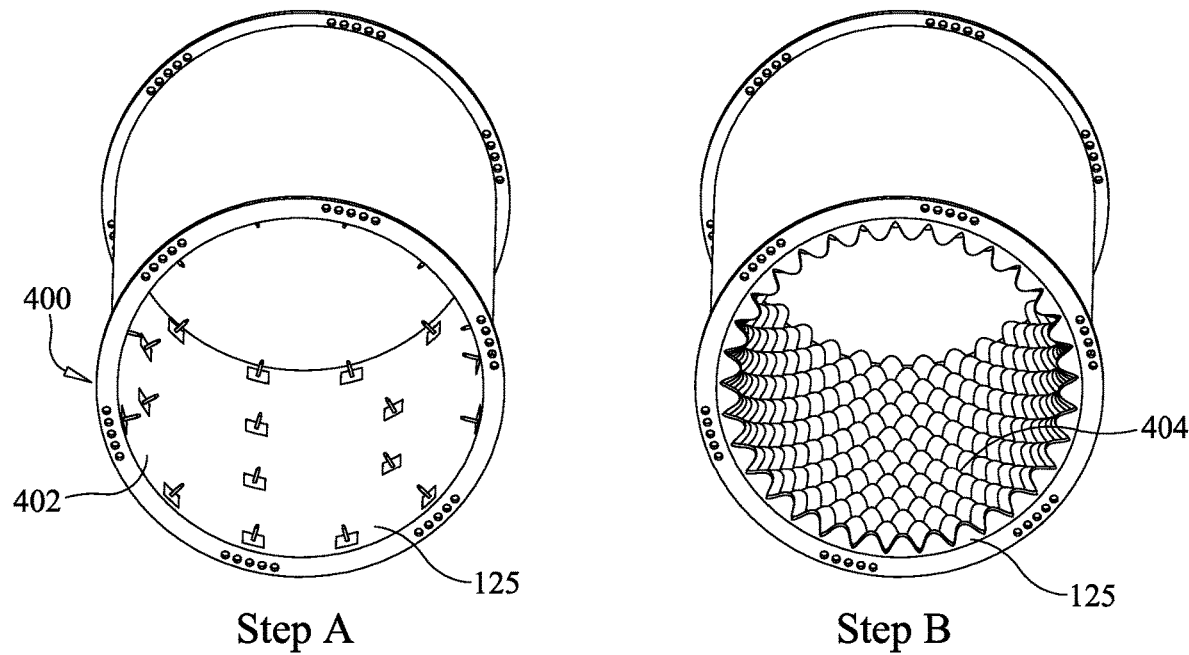

Now referring to the figures, wherein like numerals refer to like parts, FIGS. 1 and 2 illustrate an embodiment of the drying apparatus of the present disclosure for use in an automated vehicle cleaning system for cleaning the exterior of a vehicle. FIG. 3 illustrates an inlet and muffler of the drying apparatus of the present disclosure. FIG. 4 illustrates a close-up view of the drying apparatus of the present disclosure secured to the support frame arch. FIG. 5 shows a perspective view of the drying apparatus of the present disclosure, including the air nozzles. FIG. 6 illustrates a drying apparatus of the present disclosure installed in an automated washing/drying chamber. FIG. 7 illustrates an embodiment an embodiment of an axial fan in one end of a blower unit of the drying apparatus of the present disclosure. FIG. 8 illustrates an embodiment of the motor and static baffles in an opposite end from the axial fan of the blower unit of the drying apparatus of the present disclosure. FIG. 9 illustrates components of the drying apparatus of the present disclosure utilizing "quiet technology" of the present disclosure in the form of insulation or sound absorbing acoustic materials layered within an interior surface of the components.

The present drying apparatus 100 is installed within a chamber 200 as part of an automated exterior vehicle cleaning system (not shown). Automated exterior vehicle cleaning systems, having washing and drying phases in sequence are known in the industry. The drying phase is typically the last step of the cleaning process, wherein the drying apparatus 100 is installed just before the exit from the chamber 200 (FIG. 5).

The drying apparatus 100 generally comprises a support frame 150, which spans across the width of the chamber 200 and above a track (not shown) followed by a vehicle 300 as it passes through the chamber. At least two blower units 102 are typically attached to the support frame 150 using known attachment devices and processes, including fasteners (screws, bolts, etc.) and/or welding. It should be understood that any number and arrangement of blower units 102 can be used depending on the system design and specific requirements of a system.

FIGS. 1 and 2 illustrate an embodiment of a drying apparatus 100 according to the present disclosure. In this embodiment, the drying apparatus 100 includes an arrangement of three individual blower units 102 on the support frame 150, specifically a center unit 102a aligned above the longitudinal direction of a vehicle 300 and two side units 102b, one on either side of the center unit. The entire drying apparatus 100 is suspended above floor level on the support frame 150 to provide efficient drying of a vehicle 300 as it passes under the apparatus. Suspending the drying apparatus 100 also reduces moisture intake and maintains efficient drying capacity of the unit, as well as reducing the inlet noise at floor level. All of these combined features provide an improved drying apparatus 100 with reduced noise and sound levels, while offering efficient drying capability.

As shown in the present embodiments of FIGS. 1 and 2, the center unit 102a directs air flow downward on the top of the vehicle 300 as it passes beneath the center unit. The side units 102b align with the sides of the vehicle 300, directing the air flow along the sides of the vehicle as it passes by the side units. Alternatively, rather than the vehicle 300 moving below the drying apparatus 100, the apparatus may rotate around the vehicle as a single unit, while the vehicle remains stationary, such as in a gantry-style washing system.

Each blower unit 102 comprises a housing 104 having a generally cylindrical configuration. The housing 104 includes multi-sectional or modular units of components (each of which will be detailed below), which are connected together using known fasteners and/or welding. An advantage of the modular unit construction of the present drying apparatus 100 is that the apparatus can be easily transported and assembled on-site within an automated washing/drying structure.

As shown in FIGS. 4 and 5, the housing 104 for the blower unit 102, has an elbow connection 126 or "L"-shaped configuration. The "L"-shaped configuration of the housing 104 reduces the effects of the air changing direction and therefore, contributes to the reduction in noise level of the apparatus 100. The housing 104 includes an inlet 106 at one end and an air producer section 128 having a plurality of air direction nozzles 140 at an opposing end. The inlet 106 is ideally covered by a screen 108 (FIG. 3), which permits the passage of air through the housing 104 while protecting the interior of the housing from unwanted articles entering the inlet and/or passing through the housing. The housing 104 can be constructed from any suitable, corrosion-resistant material, particularly suited for existing a moist, humid environment.

As shown in FIGS. 4 and 5, each blower unit 102 can be constructed as a multi-sectional unit, which generally includes the following components within the separate sections in sequence: an inlet 106 with a muffler 120 with a muffler cap 122; a fan and motor assembly section 124; a mitered connection elbow section 126; and an outlet 107 with an air producers section 128 having a plurality of air direction nozzles 140 extending therefrom. The muffler 120, and muffler cap 122, are known components in similar drying apparatus systems. In the present apparatus 100, the muffler 120 and muffler cap 122, as known, contribute to the improved sound reduction features of the present apparatus and system.

As shown in FIGS. 7 and 8, the fan and motor assembly section 124 of the housing 104 incorporates an axial fan and motor assembly 130 comprising an axial fan 132 and motor 134. The axial fan and motor assembly 130 generate airflow for the blower unit 102. The motor 134 is a standard motor used in the blower industry.

The preferred axial fan 132 of the present disclosure comprises a plurality of airfoil blades 136 disposed around a center rotor 137, which is located in one end of the fan and motor assembly section 124 of the blower unit 102 (FIG. 7). The airfoil configuration of the blades 136 useful in the present axial fan 132, are designed with the same aerodynamics used in airplane wings to create flight. The airfoil configuration of the blades 136 typically includes a round leading edge and a sharp trailing edge, which in profile looks similar to a teardrop flattened on one side. As is understood based on the configuration of the blades 136, as the air flow approaches the blade's 136 round leading edge, the flow splits and travels above and below the blade. Air is thus deflected across the convex curve along the top of the blade 136 and along the flat or concave curve on the bottom of the blade and flows downward over the sharp trailing edge as the air leaves the blade. The airfoil configuration of the blades 136 results in less chopping of the air when the fan 132 is operating. Thus, the blades 136 in the present axial fan 132 provide high volume airflow and low noise, both of which are ideal features contributing to the quiet technology of the present drying apparatus 100.

As shown in FIG. 8, the fan and motor assembly section 124 of the blower unit 102 further includes a plurality of static vanes or baffles 138, located in an opposite end of the fan and motor assembly section from the axial fan 132. These static baffles 138 are disposed within and around the circumference of an interior surface 104a of the fan and motor assembly section 124 containing the fan and motor assembly 130. The static baffles 138 have a generally straight or slightly curved configuration and are evenly spaced around the interior surface 104a of the housing 104. The positioning and configuration of the static baffles 138 help to reduce the turbulence or vortex of the airflow generated by the airfoil blades 136 of the axial fan 132, effectively lowering the sound levels of the overall unit.

As illustrated in FIGS. 4 and 5, the fan and motor assembly section 124 of the housing 104 is connected to a mitered connection elbow section 126. The airflow passes from the axial fan 132 through the static baffles 138 and through the connection elbow section 126 in a downward direction to the air producer section 128. The curved shape of the connection elbow section 126 reduces the effects of the air flow changing directions from the axial fan 132 downward to the air producer section 128, contributing to a reduction in the overall noise level of the system.

The mitered connection elbow section 126 is further attached to an output air producer section 128. As shown in FIGS. 5 and 6, the air producer section 128 has a cylindrical shape, and is vertically positioned relative to the connection elbow section 126. At least one outwardly facing nozzle 140, preferably a plurality of nozzles, project from the outer surface 128a of the air producer section 128, with an outlet 142 of the nozzle directed toward an area where the vehicle 300 approaches the drying apparatus 100.

Preferably, any number and arrangement of nozzles 140 can be positioned on the outer surface 128a of the air producer 128. Ideally, multiple nozzles 140 are in an arrangement where they direct the air flow in the direction of the vehicle 300 passing beneath the drying apparatus 100. For example, the nozzles 140 can be directed in a downward direction toward the approaching vehicle 300, and/or to the sides of the vehicle as it passes through the drying section of the washing/drying chamber 200. As illustrated in FIGS. 5 and 6, the nozzles 140 may be arranged vertically in a row along the longitudinal axis on the outside of the air producer section 128. In this configuration, the nozzles 140 direct the air flow toward the passing vehicle 300 to effectively blow the residual water off and away from the vehicle body. A single downward directed nozzle positioned at the top of the support 150 can also be used (FIG. 6). It should be understood that although a specific number of nozzles 140 in a defined configuration is shown, any number, variety and configuration of air nozzles can be incorporated into a drying system depending on the design and requirements of the drying system and for the most effective water removal.

An advantage of the present drying apparatus 100 over other forms of dryers in the automated vehicle washing industry, is that the present apparatus utilizes a combination of features and components referred to as "quiet technology." Thus, the present drying apparatus 100, and specifically the blower unit 102 of the present apparatus, provides a quieter drying system, without compromising drying efficiency. The quiet technology of the present drying apparatus 100 includes a variety of elements and a series of components, as described, which combined together, create the quiet technology of the present apparatus. For example, as previously discussed, a muffler 120, including a muffler cap 122, can be secured at the inlet 106 of the housing 104 for the blower 102. The muffler and muffler cap are physical barriers for initially controlling the air flow entering the housing 104 and assist in reducing noise generated by the air flow.

Another feature of the present "quiet technology" is the use of the airfoil blades 136 of the axial fan 132 in combination with the opposing static baffles 138 in the fan and motor assembly 130 in the blower unit 102. The combination of the axial fan 132, with the airfoil configuration blades 136 combined with the static baffles 138, reduce air turbulence passing through these components of the fan and motor assembly section 124, which lowers sound and noise levels. Additionally, the connection elbow section 126 reduces the effects of the air changing direction, which further contributes to the overall noise reduction of the drying apparatus 100.

The combination of the above components in the blower unit 102 of the present drying apparatus 100 is effective toward reducing the sound generated by the drying apparatus. However, the present drying apparatus 100 provides a further advantage in sound reduction through utilization of a variety of sound-dampening or sound absorbing acoustic materials 400, which are applied within the interior surfaces of the various components of the drying apparatus 100. These acoustic materials reduce sound levels and deaden the steel, which effectively reduces or eliminates the ringing or reverberation of sound as it passes through the apparatus.

As shown in FIG. 9, sound absorbing acoustic materials 400 are layered to the interior of the various sections of the present drying apparatus 100. For example, the interior surface 125 of a blank of cylindrical component, such as the elbow connection section 126, is initially lined with a tar paper material 402 (Step A). The tar paper 402 is then covered with an acoustic foam material 404, which is secured by pushing the foam material onto a plurality of studs 125a positioned around the circumference of the interior surface 125 (Step B). A plastic mesh or netting 406 is cut to size to fit over the foam material 404. The mesh or netting 406 is then secured using a plurality of washers and nuts, which are tightened into place (Step C). Layering a variety of sound dampening or acoustic materials 400 reduces the sound levels of the air flow and deadens and/or eliminates the ringing or reverberation of sound as it passes through the metal blower unit 102. It should be understood that while a representative section of the drying apparatus 100 is shown, the same steps of applying the sound absorbing acoustic materials 400 is applicable to all sections of the blower unit 102 of the apparatus 100.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

I claim:

1. A drying apparatus for use in an automated vehicle cleaning system, the drying apparatus comprising:
    a support frame;
    at least one blower unit secured to the support frame, the blower unit having an inlet and an outlet;
    a fan and motor assembly positioned within the blower unit near the inlet;
    a plurality of static baffles positioned behind the fan and motor assembly; and,
    an elbow connection section connecting the fan and motor assembly with an air producer at the outlet of the blower unit, wherein the elbow connection section is adapted for changing air flow through the section to the air producer and reduce a sound level of the apparatus.

2. The drying apparatus of claim 1, wherein the support frame and the at least one blower unit are mounted above a path spanning a width of a vehicle.

3. The drying apparatus of claim 1, wherein the apparatus further includes a plurality of blower units arranged on the support frame.

4. The drying apparatus of claim 1, wherein the blower unit further comprises a muffler positioned at the inlet of the blower unit.

5. The drying apparatus of claim 1, wherein the fan and motor assembly includes a fan having a plurality of airfoil blades disposed around a center rotor.

6. The drying apparatus of claim 5, wherein the plurality of airfoil blades and static baffles are adapted for increasing an air flow and reducing a sound level of the apparatus.

7. The drying apparatus of claim 1, wherein the air producer further includes a plurality of air nozzles arranged on an outer surface of the air producer.

8. The drying apparatus of claim 1, wherein the blower unit further includes sound absorbing acoustic materials applied to an interior surface of the blower unit.

9. The drying apparatus of claim 7, wherein sound absorbing acoustic materials are applied to an interior surface of the air producer.

10. A blower unit for use in a drying apparatus for an automated vehicle cleaning system, the blower unit comprising:
   an inlet section including a muffler;
   a fan and motor assembly section connected to the inlet section;
   an air producer outlet section; and,
   an elbow connection section connecting the fan and motor assembly section with the air producer outlet section.

11. The blower unit of claim 10, wherein the blower unit further includes sound absorbing acoustic materials applied to an interior surface of the elbow connection section.

12. The blower unit of claim 10, wherein the unit further includes sound absorbing acoustic materials applied to an interior surface of the air producer outlet section.

13. The blower unit of claim 10, wherein the blower unit is configured for an increase in air flow and a reduction in noise level.

14. A system for automated drying of a vehicle in an automated washing system, the system comprising:
   a chamber for receiving a vehicle;
   a support frame positioned within the chamber and above a path for receiving the vehicle;
   a drying apparatus attached on the support frame and positioned near an exit of the chamber, the drying apparatus comprising:
   at least one blower unit secured to the support frame, the blower unit having an inlet for receiving an air flow;
   a fan and motor assembly positioned within the blower unit, wherein the fan includes a plurality of airfoil blades disposed around a rotor;
   an air producer at an outlet of the blower unit;
   an elbow connection between the fan and motor assembly and the air producer, wherein the elbow connection directs the air flow from the fan and motor assembly to the air producer; and,
   wherein the drying apparatus is configured to increase the air flow through the system while reducing a sound level of the air flow.

15. The system of claim 14 wherein a plurality of static baffles are positioned behind the airfoil blades of the fan and motor assembly.

16. The system of claim 15, wherein the plurality of airfoil blades and static baffles are configured for reducing air turbulence through the system.

17. The system of claim 14, wherein the plurality of airfoil blades and static baffles are configured for increasing air flow through the drying apparatus and reducing a sound level of the apparatus.

18. The system of claim 17, wherein the blower unit further includes a plurality of layers of sound absorbing acoustic materials applied to an interior surface of the blower unit.

\* \* \* \* \*